United States Patent
Byun (10) Patent No.: US 10,941,600 B2
(45) Date of Patent: Mar. 9, 2021

(54) HINGE DEVICE FOR WASHING MACHINE DOOR

(71) Applicant: EPTECH CO., LTD., Gyeonggi-do (KR)

(72) Inventor: Yong Kun Byun, Gyeonggi-do (KR)

(73) Assignee: EPTECH CO., LTD., Gyeonggi-do (KR)

( * ) Notice: Subject to any disclaimer, the term of this patent is extended or adjusted under 35 U.S.C. 154(b) by 42 days.

(21) Appl. No.: 16/343,608

(22) PCT Filed: Oct. 24, 2017

(86) PCT No.: PCT/KR2017/011766
§ 371 (c)(1),
(2) Date: Apr. 19, 2019

(87) PCT Pub. No.: WO2018/080134
PCT Pub. Date: May 3, 2018

(65) Prior Publication Data
US 2020/0063327 A1     Feb. 27, 2020

(30) Foreign Application Priority Data
Oct. 27, 2016    (KR) .................. 10-2016-0140906

(51) Int. Cl.
*E05F 3/20* (2006.01)
*E05F 3/10* (2006.01)
*D06F 39/14* (2006.01)

(52) U.S. Cl.
CPC ................ *E05F 3/20* (2013.01); *E05F 3/104* (2013.01); *D06F 39/14* (2013.01); *E05Y 2201/212* (2013.01); *E05Y 2201/474* (2013.01); *E05Y 2900/312* (2013.01)

(58) Field of Classification Search
CPC ....... E05F 3/20; E05F 3/04; E05F 3/10; E05F 3/104; E05F 3/12
See application file for complete search history.

(56) References Cited

U.S. PATENT DOCUMENTS

| | | | | |
|---|---|---|---|---|
| 1,226,258 A | * | 5/1917 | Rogers ....................... | E05F 3/20 16/54 |
| 2,367,959 A | * | 1/1945 | Morris ....................... | E05F 3/10 16/52 |
| 2,538,678 A | * | 1/1951 | Foltis ........................ | E05F 3/20 16/68 |

(Continued)

FOREIGN PATENT DOCUMENTS

| KR | 200413325 Y1 | 4/2006 |
|---|---|---|
| KR | 100853768 B1 | 8/2008 |

(Continued)

OTHER PUBLICATIONS

International Search Report for PCT/KR2017/011766 dated Feb. 2, 2018.

(Continued)

*Primary Examiner* — Jeffrey O'Brien
(74) *Attorney, Agent, or Firm* — Millen, White, Zelano & Branigan, P.C.; William Nixon (57) ABSTRACT

A hinge device connecting a door rotatably to a washing machine main body, which enables the door to be closed smoothly and slowly, and to be opened easily.

3 Claims, 13 Drawing Sheets

(56) References Cited

U.S. PATENT DOCUMENTS

| | | | | |
|---|---|---|---|---|
| 4,185,356 | A * | 1/1980 | Kuivalainen | E05F 3/12 16/52 |
| 5,419,013 | A * | 5/1995 | Hsiao | A47K 13/12 16/319 |
| 7,240,603 | B2 * | 7/2007 | Juntunen | E05F 3/12 16/52 |
| 7,900,319 | B2 * | 3/2011 | Bacchetti | E05D 5/0246 16/252 |
| 8,720,005 | B2 * | 5/2014 | Cheng | E05D 11/1014 16/54 |
| 9,297,191 | B1 * | 3/2016 | Chen | E05D 5/02 |
| 9,790,723 | B2 * | 10/2017 | Bienek | E05F 3/10 |
| 2007/0033768 | A1 * | 2/2007 | Ginzel | E05F 3/04 16/71 |
| 2013/0160238 | A1 * | 6/2013 | Cheng | E05D 11/1014 16/54 |
| 2018/0106087 | A1 * | 4/2018 | Bacchetti | E05F 1/1223 |
| 2020/0115943 | A1 * | 4/2020 | Bacchetti | E05F 3/104 |

FOREIGN PATENT DOCUMENTS

| | | |
|---|---|---|
| KR | 101267339 B1 | 5/2013 |
| KR | 101383868 B1 | 4/2014 |
| KR | 20150116342 A | 10/2015 |

OTHER PUBLICATIONS

English Abstract for KR-101267339, Publication Date: May 24, 2013.

English Abstract for KR-100853768, Publication Date: Aug. 22, 2008.

English Abstract for KR-20150116342, Publication Date: Oct. 15, 2015.

English Abstract for KR-101383868, Publication Date: Apr. 10, 2014.

* cited by examiner

PRIOR ART

HINGE DEVICE FOR WASHING MACHINE DOOR

TECHNICAL FIELD

The present invention relates to a hinge device connecting a door rotatably to a washing machine main body, and more particularly to a hinge device for a washing machine door which enables the door to be closed smoothly and slowly, and to be opened easily.

BACKGROUND ART

In general, a door installed to a washing machine is connected to a hinge device so that the door is closed smoothly and slowly when a washing machine main body is closed. Prior art with regard to such hinge device is disclosed in Korean Patent Application No. 10-2010-50281 as a hinge device for a washing machine door.

Figure 1:
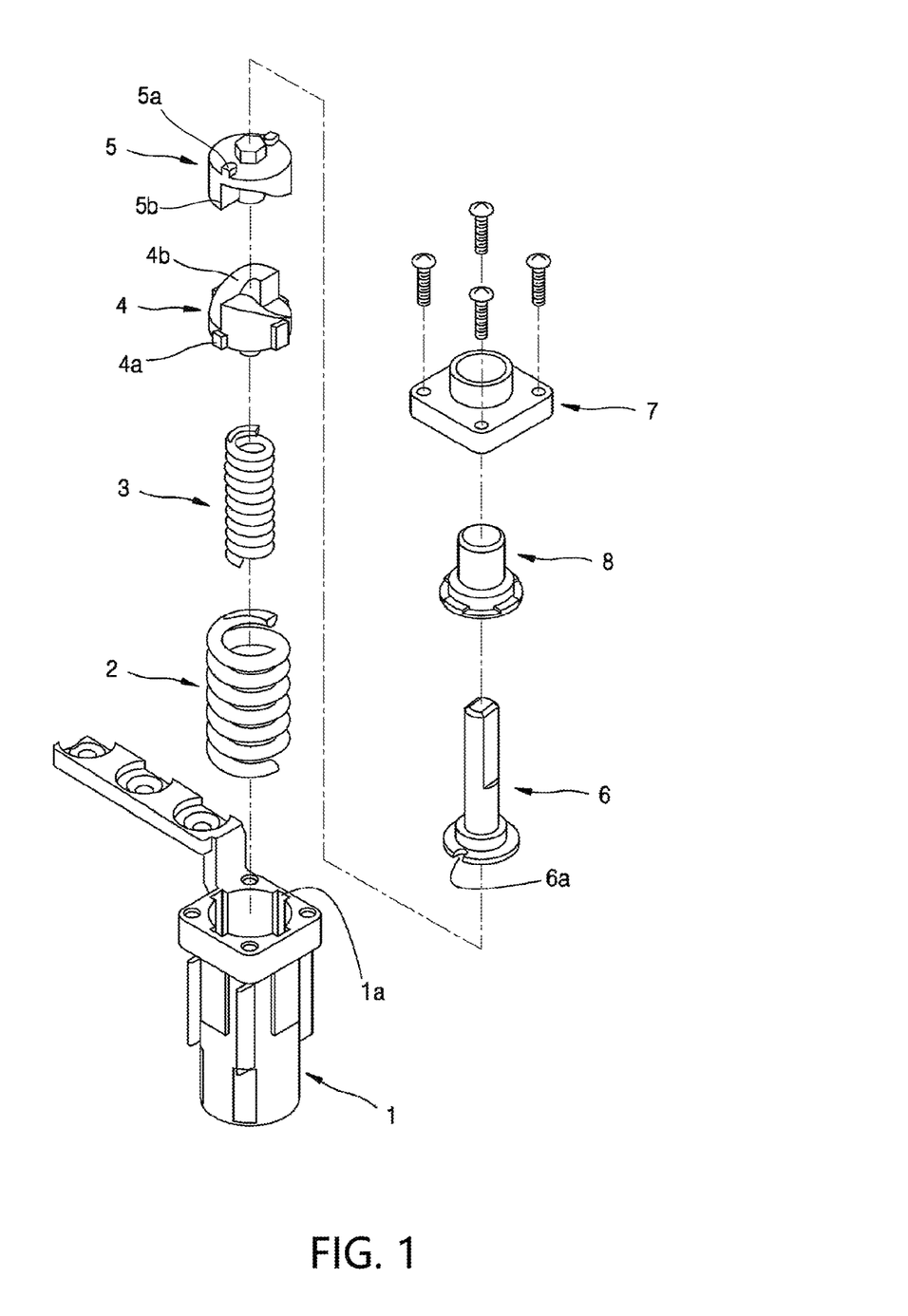
FIG. 1 is an exploded perspective view of a conventional hinge device for a washing machine door.

FIG. 1 is an exploded perspective view of a conventional hinge device for a washing machine door.

The conventional hinge device for a washing machine door includes: a housing 1 which is fixed to a washing main body, and inside which a vertical groove 1a is formed; a spring 2 inserted into the housing 1; a second spring 3 inserted into and positioned inside the first spring 2; a lower cam 4 which is inserted into the housing 1 and elastically supported by the first and second springs 2 and 3, and which is provided with a projection 4a formed at a side to be slidably inserted into the vertical groove 1a, and with a first cam 4b formed at a top side; an upper cam 5 which is inserted into the housing 1, and which is provided with a coupling projection 5a formed at a top side, and with a second cam 5b formed at a lower side to be cam-coupled to the first cam 4b; a hinge shaft 6 in which a coupling groove 6a coupled to the coupling projection 5a while inserted into the housing 1 is formed, and which is connected to the door of a washing machine; a cover 7 through which the hinge shaft 6 passes, and which is coupled to the housing 1; and a bush 8 which is installed between the cover 7 and the hinge shaft 6, and which facilitates rotation of the hinge shaft 6.

According to such configuration of the hinge device, when the hinge shaft 6 is rotated according to an opening and closing operation of the washing machine door, the upper cam 5 is rotated together, and at this time, the upper cam 5 is prevented from being rotated hastily by the upper cam 5 being cam-coupled to the lower cam 4 on which resilient forces are applied by the first and second springs 2 and 3, so that the washing machine door is not closed hastily.

However, in the aforementioned hinge device, as the force which prevents the door from being closed hastily is formed by the resilient forces of the first and second springs 2 and 3, and the cam-coupling structure of the upper and lower cams 4 and 5, the opening and closing operation of the door was not performed smoothly when the resilient forces of the first and second springs 2 and 3 were degraded, and furthermore an opening and closing speed of the door was varied because the resilient forces became non-uniform.

DISCLOSURE

Technical Problem

The invention is conceived to address the aforementioned problems, and the object is to provide a hinge device for a washing machine door enabling not only an opening and closing operation of the washing machine door but also an opening and closing speed to become uniform even though time has elapsed.

Another object of the invention is to provide a hinge device for a washing machine door enabling the washing machine door to be closed smoothly by applying a damping force immediately when the washing machine door is opened slightly and then closed.

Technical Solution

In order to accomplish the aforementioned objects, a hinge device for a washing machine door according to the invention includes: a housing 10 that is fixed to one among a washing machine main body and a washing machine door, and in which a plurality of guide projections 11 are provided at an inlet side and an injection hole 12, through which oil is injected, is formed at a rear side; a spring 20 inserted into the housing 10; an oil damper 30 that is elastically supported by the spring 20, and in which first and second flow paths passing therethrough are formed; a lower cam 40 that closely contacts a front end of the oil damper 30, and in which a guide groove 41 guided along the guide projection 11 is formed in a side surface and a first cam 45 having an inclined surface is provided at an upper side; an upper cam 50 in which a second cam 55 cam-coupled to the first cam 45 is provided at a lower side, and a fitting protrusion 51 is provided at an upper side; a main O-ring 60 that closely contacts an inner circumferential surface of the housing 10 while coupled to the fitting protrusion 51, and is for preventing the oil filling the housing 10 from leaking to the outside; a hinge shaft 70 non-rotatably coupled to the upper cam 50 and fixed to another among the washing machine main body and the washing machine door; and a bush cover 80 supporting the hinge shaft 70 so that the hinge shaft 70 passes therethrough, and allowing the hinge shaft 70 to smoothly rotate while coupled to the inlet of the housing 10.

In the invention, the oil damper 30 includes a damper body 31 elastically supported by the spring 20; a damper pin 32 coupled with the damper body 31; a check plate 33 coupled to the damper body 31 such that the damper pin 32 is accommodated; a check ball 34 accommodated in the damper pin 32 and constrained from leaving the damper pin by the check plate 33; and an O-ring 35 coupled to an outer circumferential surface of the damper body 31.

In the invention, the damper body 31 includes an coupling hole 31a passing therethrough, a first elongate hanging groove 31b with an inner diameter greater than that of the coupling hole 31a, a second elongate hanging groove 31c with an inner diameter greater than that of the first elongate hanging groove 31b, and an annular groove 31d which is formed on the outer circumferential surface, and into which the O-ring 35 is coupled.

In the invention, the damper pin 32 includes a pin body 32a inserted into and coupled to the coupling hole 31a, a first hanging end 32b which is formed at one side of the pin body 32a, and inserted into and coupled to the first elongate hanging groove 31b, a first pin hole 32c passing through the pin body 32a, a second pin hole 32d which is formed in the pin body 32a of the first hanging end 32b side and has an inner diameter greater than that of the first pin hole 32c, and a groove line 32e formed in a zigzag pattern along an outer circumferential surface of the pin body 32a and an outer circumferential surface of the hanging end 32b.

In the invention, the check plate 33 includes a second hanging end 33a inserted into and coupled to the second elongate hanging groove 31c of the damper body, an elongate hole 33b formed at a center portion, and a circular hole 33c formed at a center portion of the elongate hole 33b, and wherein the check ball 34 is movably accommodated in the second pin hole 32d, and has an outer diameter greater than the inner diameter of the first pin hole 32c and the inner diameter of the circular hole 33c.

Advantageous Effects

According to the invention, by employing the oil damper in which the first and second flow paths are formed, an uniform damping force can be applied between the lower cam and the upper cam, thus enabling not only an opening and closing operation but also an opening and closing speed to be uniform even though time has elapsed.

Further, the first flow path is constituted by the first pin hole and the second pin hole, the second flow path is constituted by the inner circumferential surface of the coupling hole and the groove line formed in a zigzag pattern, and such a way as the check ball opens or closes the first flow path inside the second pin hole is employed, whereby, even when the washing machine door is opened slightly and closed, it is possible to generate a damping force which prevents the washing machine door from being closed hastily. According to this, if it is employed to a large washing machine, the damping force can be applied even when the door is slightly opened and closed, so that the relatively heavy washing machine door is prevented from being damaged due to the impact.

Further, advantageously, as the oil is injected to the housing through the injection hole, the damping force applied when the hinge shaft is rotated can be varied by varying viscosity of the oil filled after assembly of the hinge device of the invention has been completed, so that it is possible to be applied universally to a relatively heavy or light door.

BEST MODE

Hereinafter, a hinge device for a washing machine door according to the invention will be described in detail with reference to the accompanying drawings.

Figure 2:
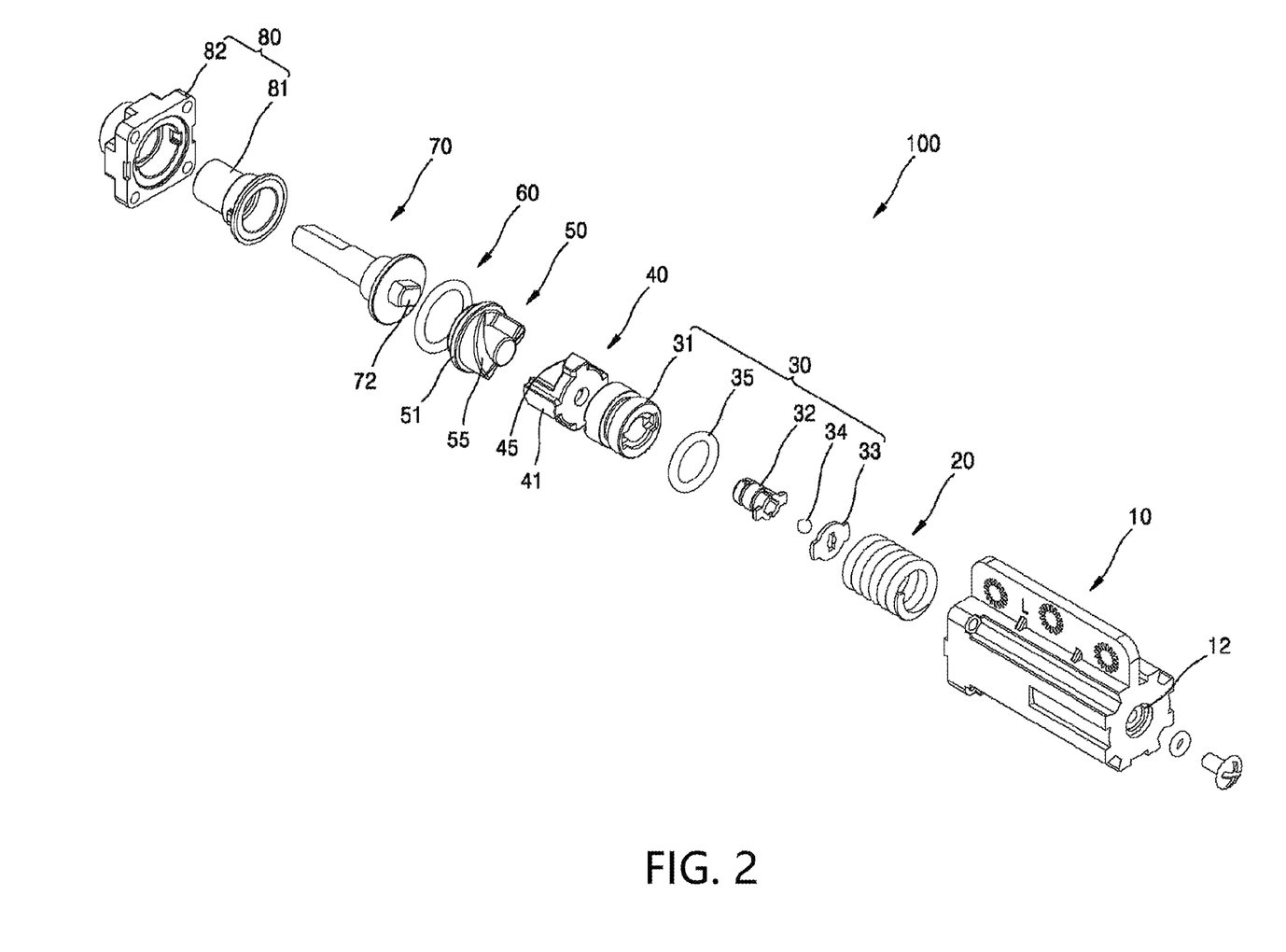
FIG. 2 is an exploded perspective view of the hinge device for a washing machine door according to the present invention.
Figure 3:
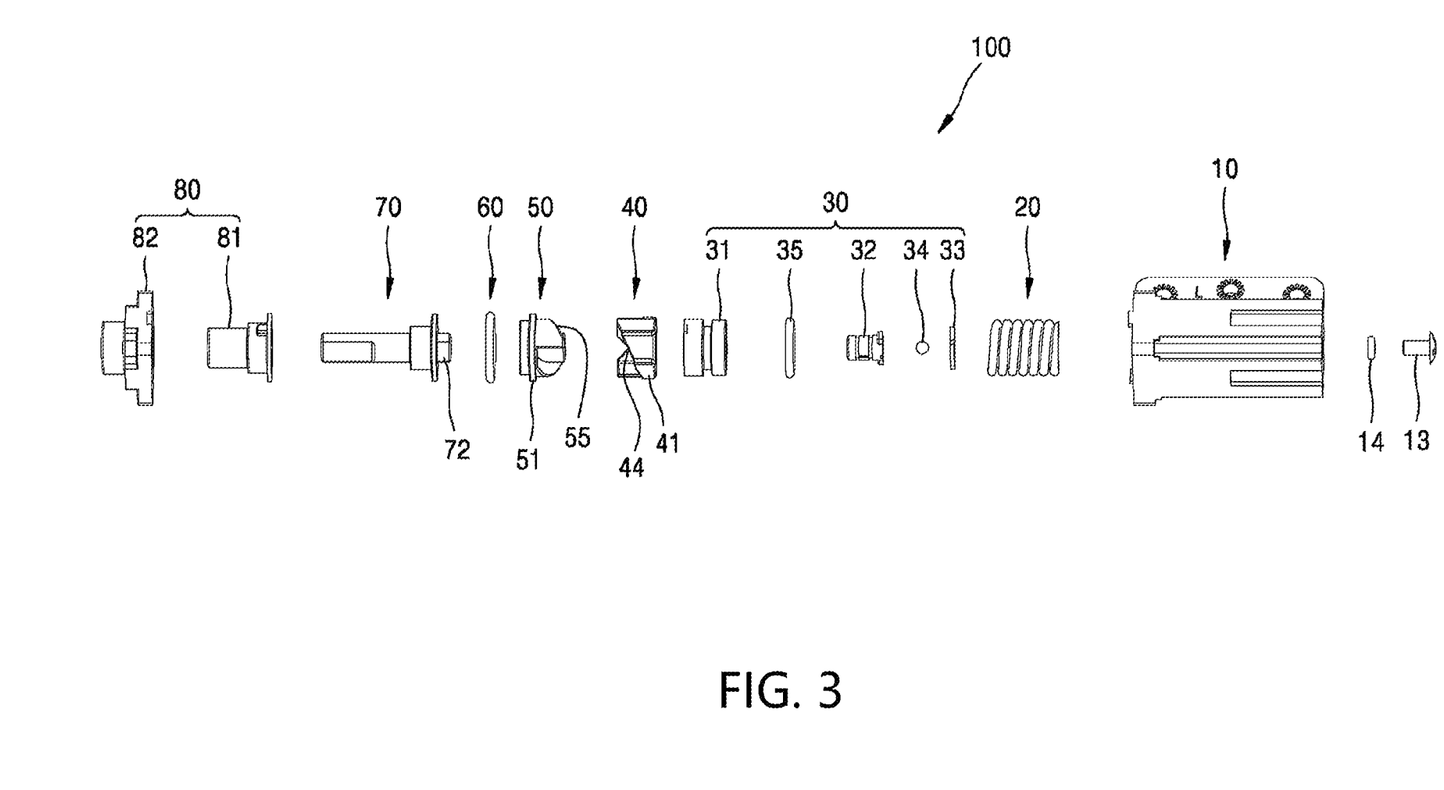
FIG. 3 is a diagram in which the exploded perspective view of the hinge device of FIG. 2 is viewed in a different angle.
Figure 4:
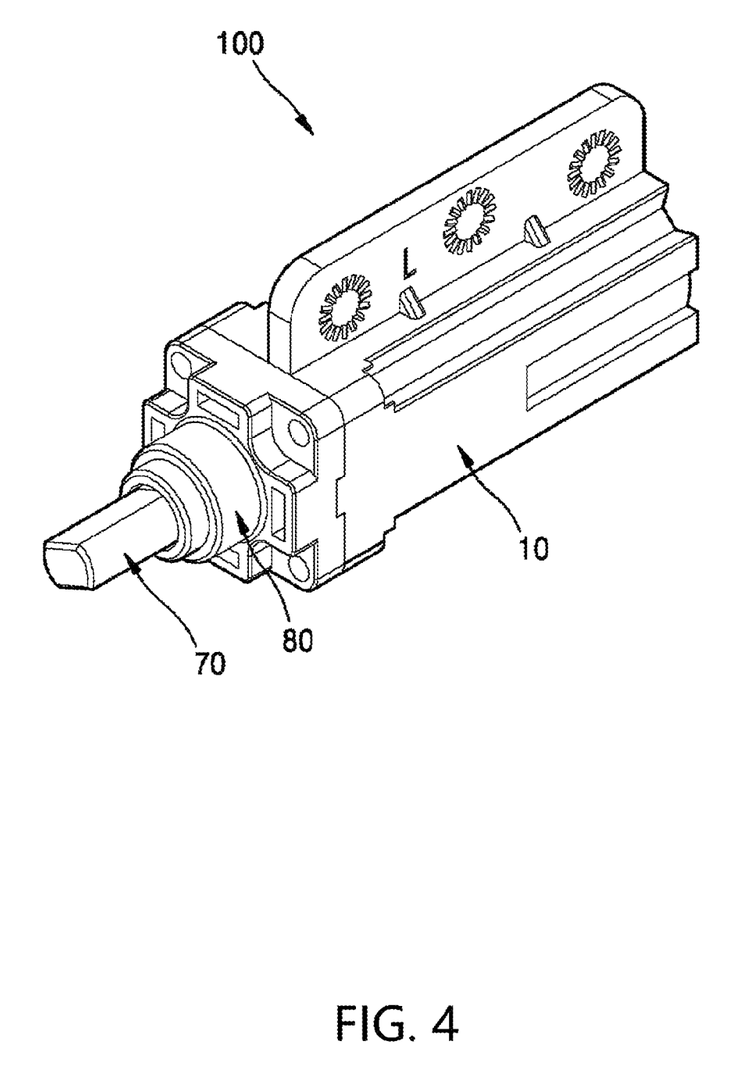
FIG. 4 is an assembled perspective view of the hinge device of FIGS. 2 and 3.
Figure 5:
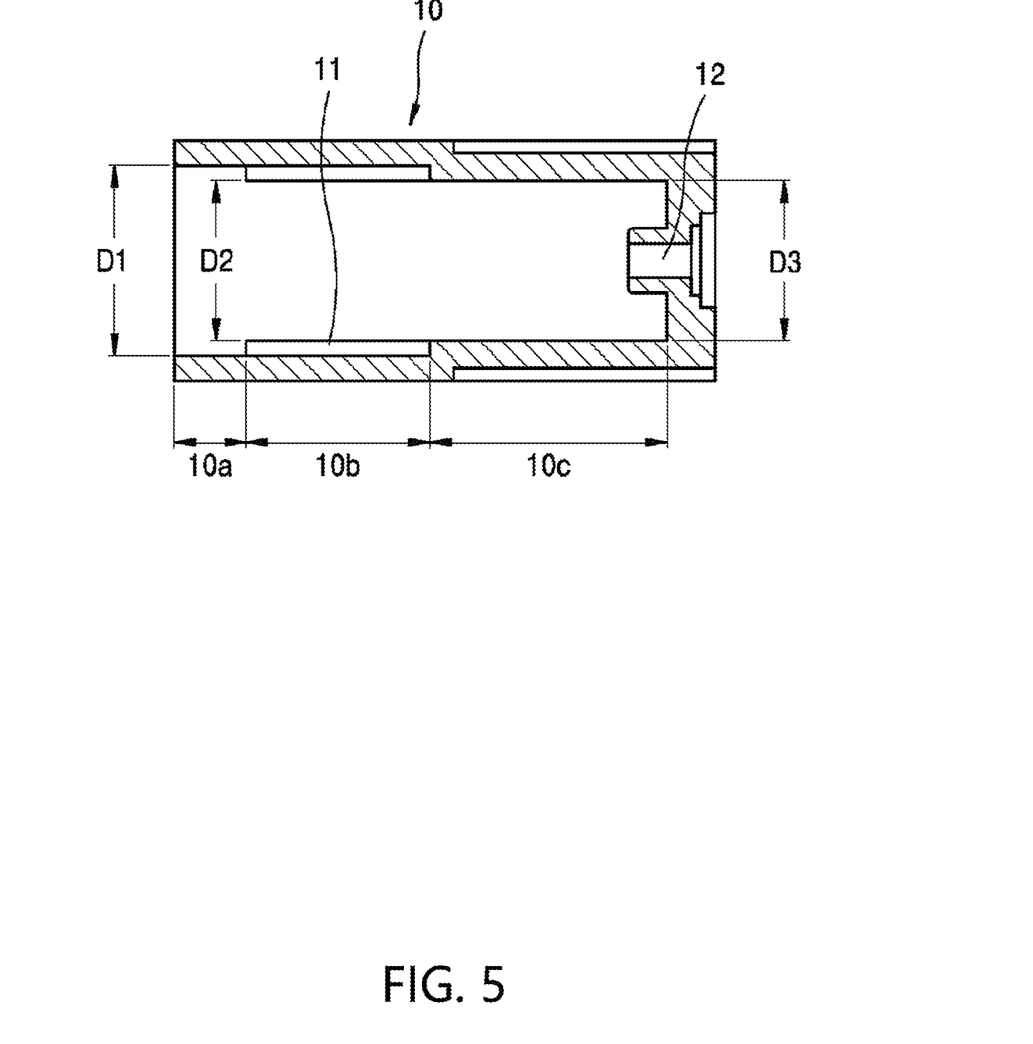
FIG. 5 is a side cross-sectional view extracting and showing a housing of FIGS. 2 and 3.

FIG. 2 is an exploded perspective view of the hinge device for a washing machine door according to the present invention, FIG. 3 is a diagram in which the exploded perspective view of the hinge device of FIG. 2 is viewed in a different angle, FIG. 4 is an assembled perspective view of the hinge device of FIGS. 2 and 3, and FIG. 5 is a side cross-sectional view extracting and showing a housing of FIGS. 2 and 3.

As shown, the hinge device 100 of a washing machine door includes: a housing 10 that is fixed to one among a washing machine main body and a washing machine door, and in which a plurality of guide projections 11 are provided at an inlet side and an injection hole 12, through which oil is injected, is formed at a rear side; a spring 20 inserted into the housing 10; an oil damper 30 that is elastically supported by the spring 20, and in which first and second flow paths passing therethrough are formed; a lower cam 40 that closely contacts a front end of the oil damper 30, and in which a guide groove 41 guided along the guide projection 11 is formed in a side surface and a first cam 45 having an inclined surface is provided at an upper side; an upper cam 50 in which a second cam 55 cam-coupled to the first cam 45 is provided at a lower side, and a fitting protrusion 51 is provided at an upper side; a main O-ring 60 that closely contacts an inner circumferential surface of the housing 10 while coupled to the fitting protrusion 51, and is for preventing the oil filling the housing 10 from leaking to the outside; a hinge shaft 70 non-rotatably coupled to the upper cam 50 and fixed to another among the washing machine main body and the washing machine door; and a bush cover 80 supporting the hinge shaft 70 so that the hinge shaft 70 passes therethrough, and allowing the hinge shaft 70 to smoothly rotate while coupled to the inlet of the housing 10.

In the embodiment, the housing 10 of the hinge device 100 will be described as being fixed to the washing machine main body, and the hinge shaft 70 will be described as being installed at the washing machine door.

As shown in FIG. 5, the housing 10 is configured with a first space 10a having an inlet side inner circumferential surface of a first inner diameter D1; a second space 10b, in which a multiple guide projections 11 are formed, forming an inner circumferential surface of a second inner diameter D2; and a third space 10c having an inner circumferential surface of a third inner diameter D3, which is communicated with the injection hole 12, and in which the spring 20 is accommodated. In this case, the second inner diameter D2 of the second space 10b is equal to the third diameter D3 of the third space 10c, and the first diameter D1 of the first space 10a is greater than those of the second and third spaces D2 and D3.

The injection hole 12 is a hole for filling the inside of the housing 10 with oil, and a caulking screw 13 and an O-ring 14 are installed at the injection hole 12.

As shown in FIGS. 2 and 3, in a side surface of the lower cam 40, a guide groove 41 guided along the guide projection 11 is formed. Therefore, when the lower cam 40 is inserted into the housing 10, the guide groove 41 formed in the side surface of the lower cam is fitted with the first guide projection 11, whereby the lower cam 40 is assembled so as to be movable in a front direction with respect to the housing 10 but so as not to be rotatable.

As shown in FIGS. 2 and 3, when the upper cam 50 is inserted into the housing 10, the second cam 55 formed at the lower side is cam-coupled with the first cam 45 formed at the upper side of the lower cam 40. In an upper side of the upper cam 50, a rectangular coupling groove (not shown), to which a rectangular coupling projection 72 of the hinge shaft 70 to be described below is non-rotatably coupled, is formed.

As shown in FIGS. 2 and 3, the main O-ring 60 is coupled to the fitting protrusion 51 of the upper cam 50 to closely contact the inner circumferential surface of the first space 10a of the housing 10. Such main O-ring 60 is for preventing the oil filling the housing 10 from leaking to the outside through a bush cover 80.

The hinge shaft 70 is non-rotatably coupled to the upper cam 50, and in order for this, the rectangular coupling projection 72 fitting into the rectangular coupling groove 52 of the upper cam 50 is formed at the rear side.

The bush cover 80 is embodied by assembling the bush 81, through which the hinge shaft 70 passes, to a cover 82, and for such bush cover 80 is a general construction in the art, further detailed description will be omitted.

Figure 6:
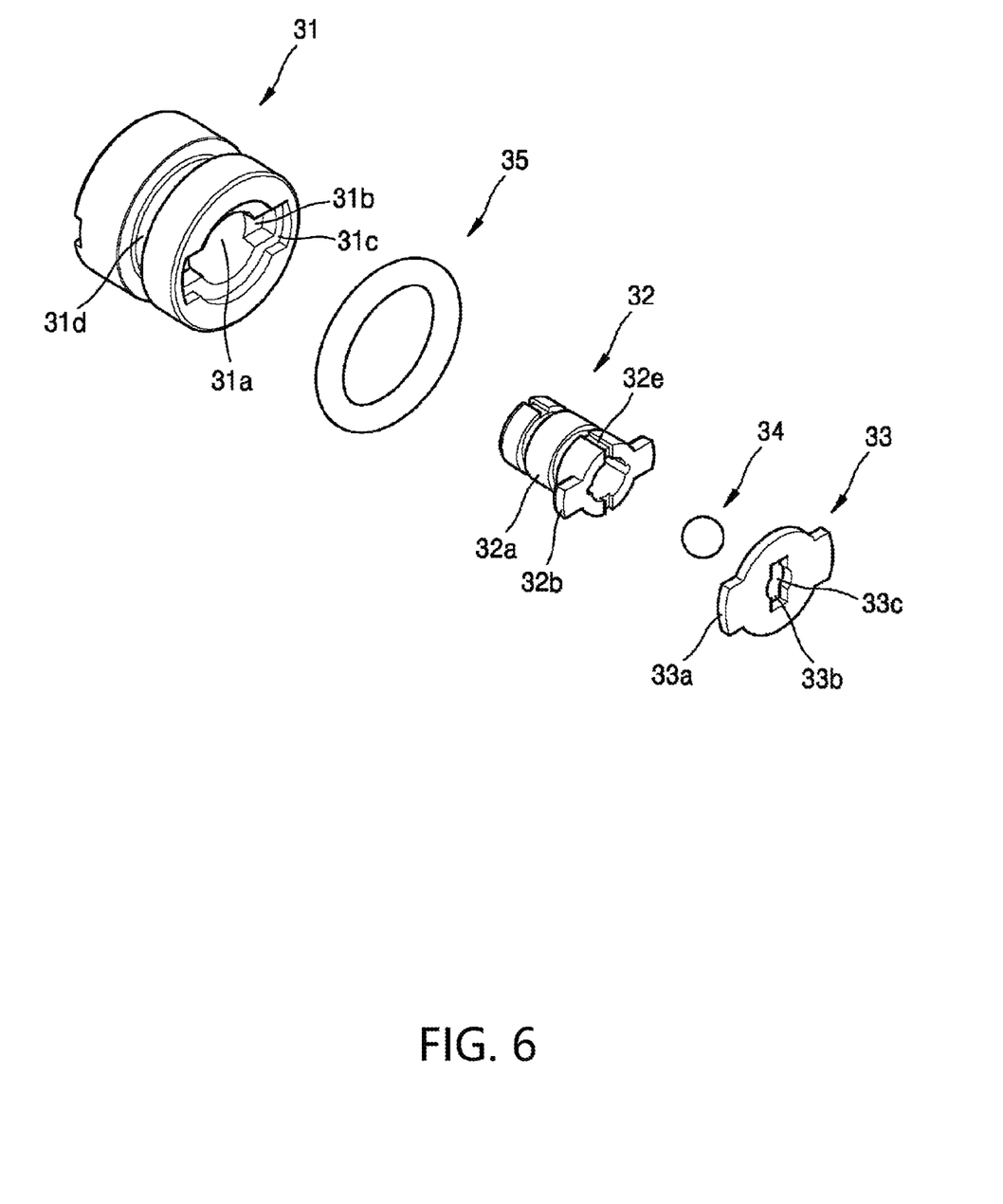
FIG. 6 is an exploded perspective view extracting and showing an oil damper of FIGS. 2 and 3.
Figure 7:
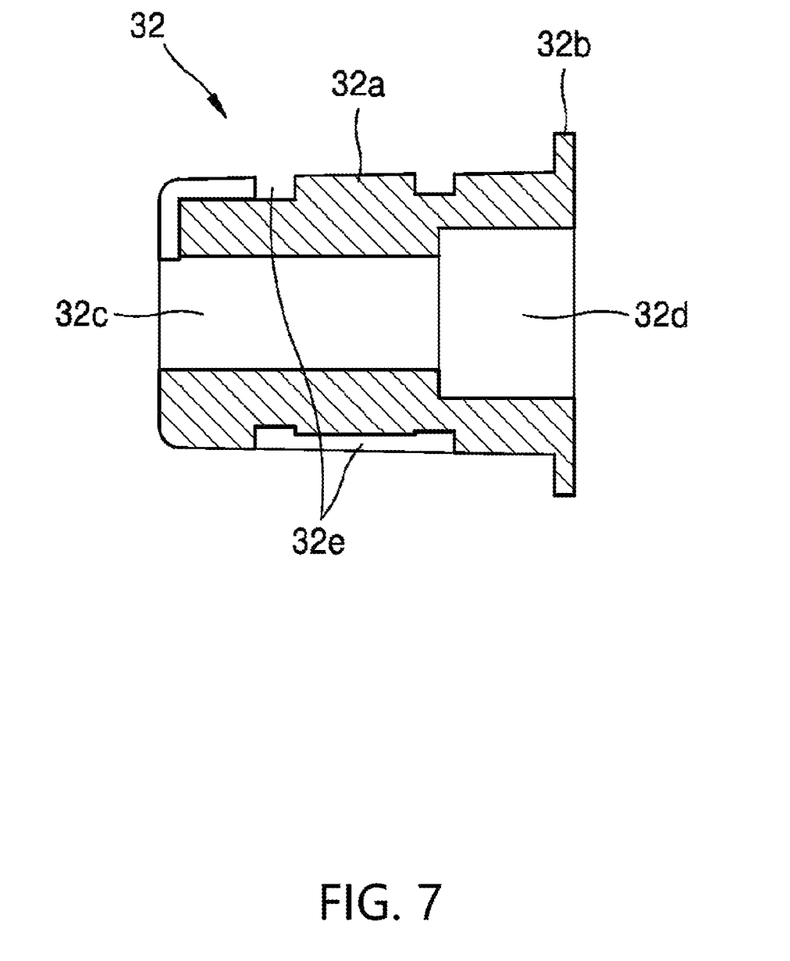
FIG. 7 is a cross-sectional view extracting and showing a damper pin of FIG. 6.
Figure 8:
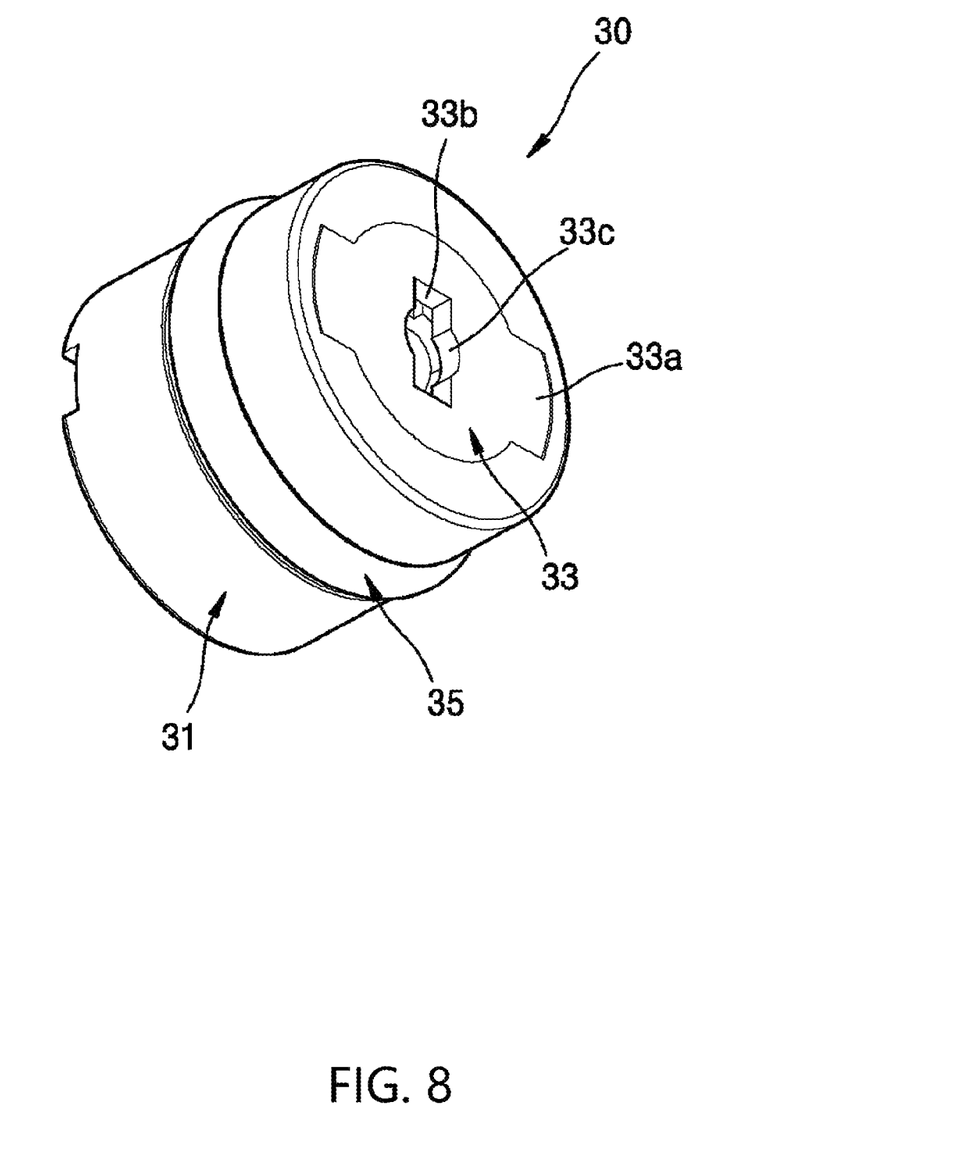
FIG. 8 is an assembled prospective view of the oil damper of FIG. 6.
Figure 9:
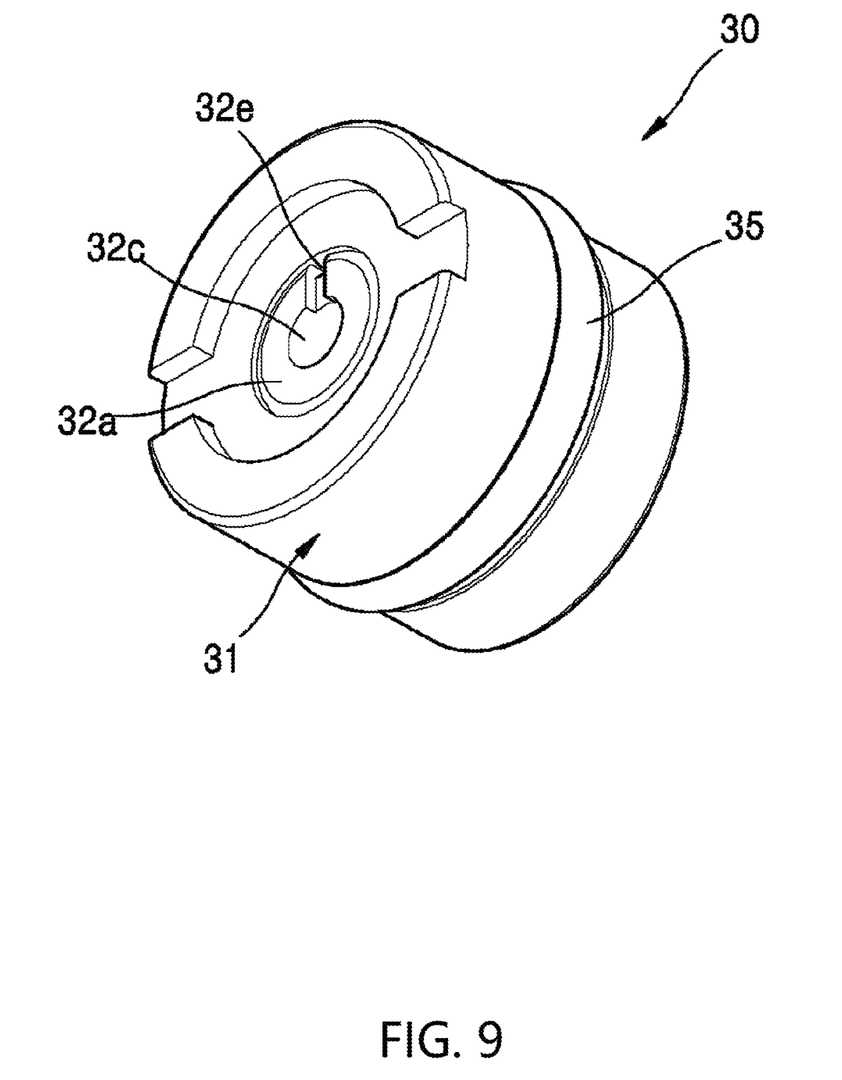
FIG. 9 is a diagram in which an assembled perspective view of the oil damper of FIG. 8 is viewed in a different angle.
Figure 10:
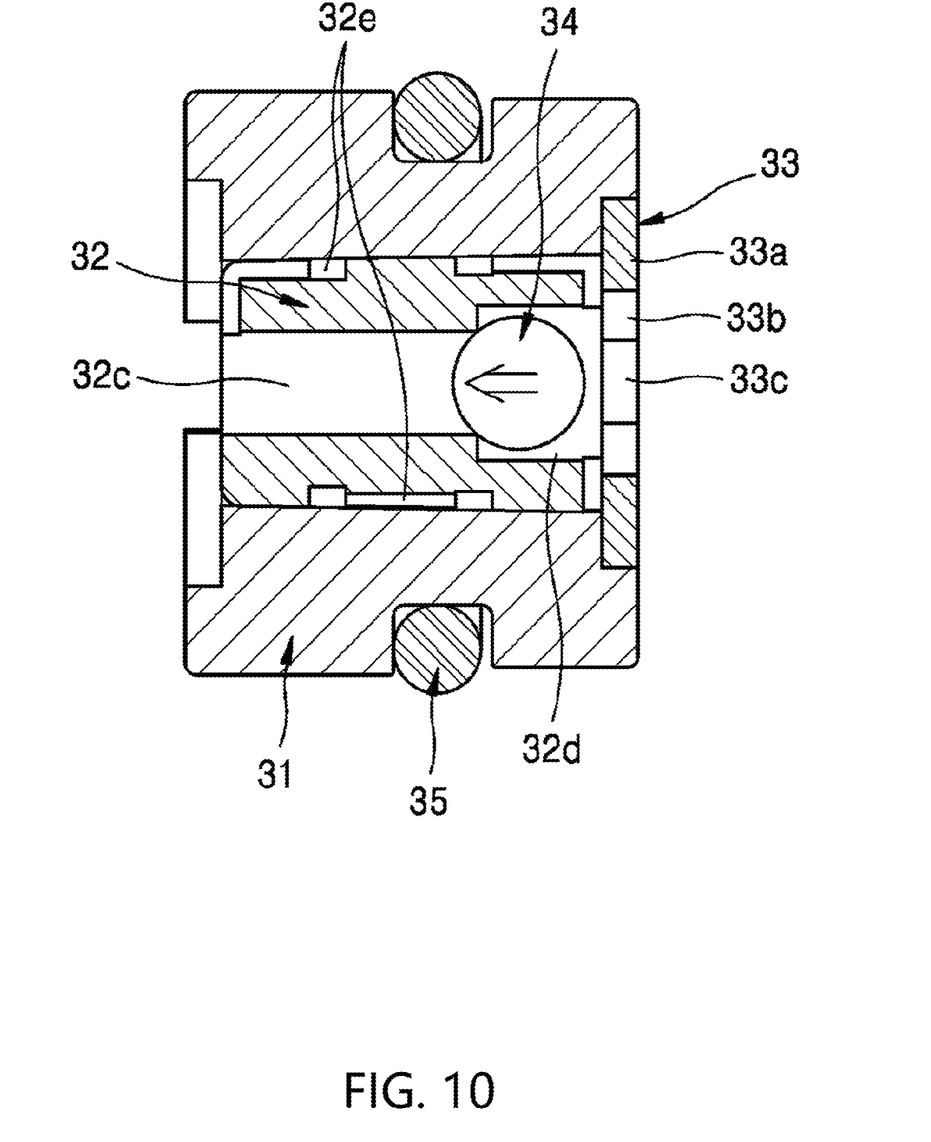
FIGS. 10 and 11 are diagrams for explaining movement of a check ball when the oil damper of FIGS. 8 and 9 is moved in one direction and the other direction.
Figure 11:
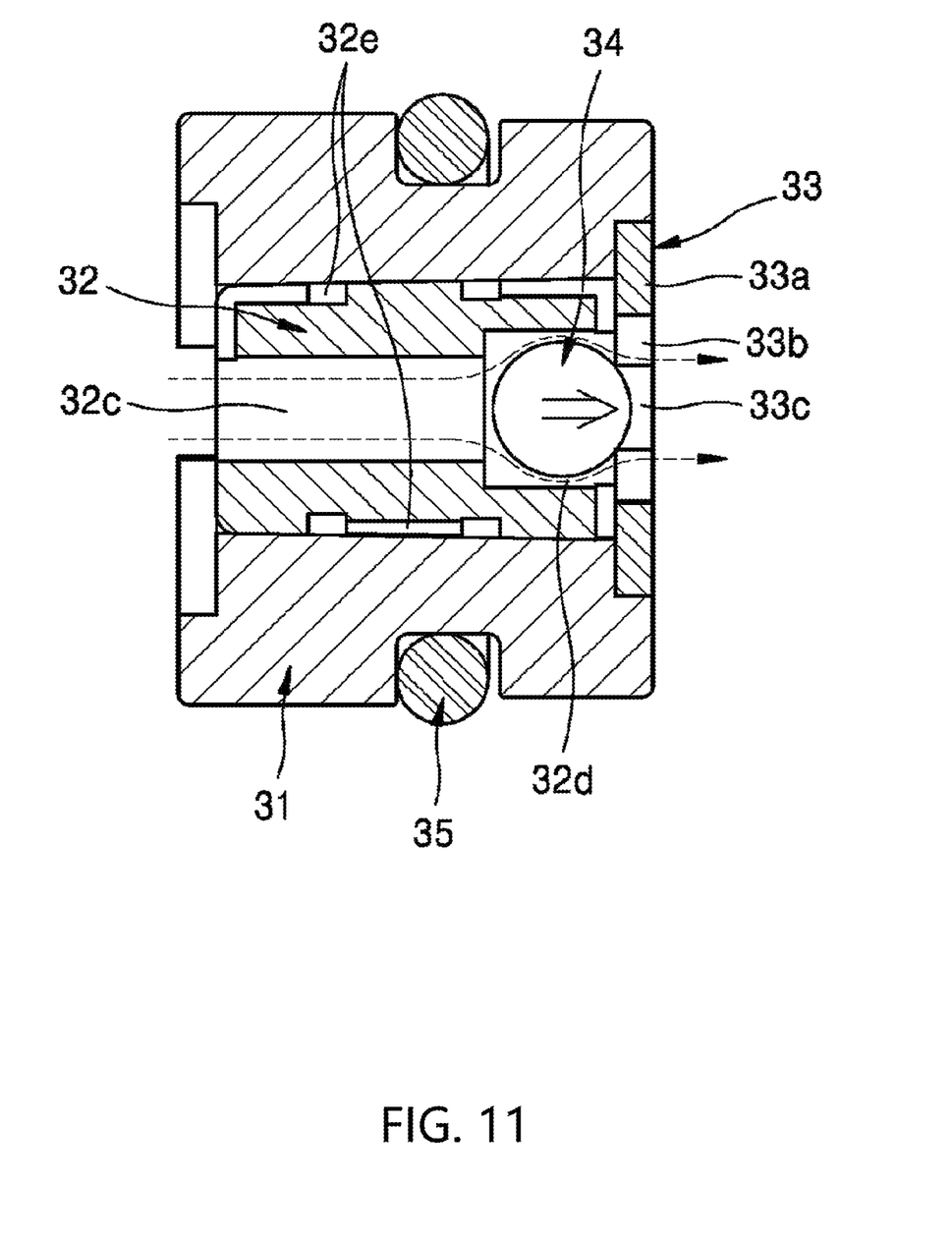

FIG. 6 is an exploded perspective view extracting and showing the oil damper of FIGS. 2 and 3, FIG. 7 is a cross-sectional view extracting and showing the damper pin of FIG. 6. Further, FIG. 8 is an assembled prospective view of the oil damper of FIG. 6, FIG. 9 is a diagram in which an assembled perspective view of the oil damper of FIG. 8 is viewed in a different angle. And FIGS. 10 and 11 are diagrams for explaining movement of the check ball when the oil damper of FIGS. 8 and 9 is moved in one direction and the other direction.

As shown in FIG. 6, the oil damper 30 includes a damper body 31 elastically supported by the spring 20; a damper pin 32 coupled with the damper body 31; a check plate 33 coupled to the damper body 31 such that the damper pin 32 is accommodated; a check ball 34 accommodated in the damper pin 32 and constrained from leaving the damper pin by the check plate 33; and an O-ring 35 coupled to an outer circumferential surface of the damper body 31.

The damper body 31 includes an coupling hole 31a passing therethrough, a first elongate hanging groove 31b with an inner diameter greater than that of the coupling hole 31a, a second elongate hanging groove 31c with an inner diameter greater than that of the first elongate hanging groove 31b, and an annular groove 31d which is formed on the outer circumferential surface, and into which the O-ring 35 is coupled.

As shown in FIG. 7, the damper pin 32 includes a pin body 32a inserted into and coupled to the coupling hole 31a, a first hanging end 32b which is formed at one side of the pin body 32a, and inserted into and coupled to the first elongate hanging groove 31b, a first pin hole 32c passing through the pin body 32a, a second pin hole 32d which is formed in the pin body 32a of the first hanging end 32b side and has an inner diameter greater than that of the first pin hole 32c, and a groove line 32e formed in a zigzag pattern along an outer circumferential surface of the pin body 32a and an outer circumferential surface of the hanging end 32b.

As shown in FIG. 6, the check plate 33 includes a second hanging end 33a inserted into and coupled to the second elongate hanging groove 31c of the damper body, an elongate hole 33b formed at a center portion, and a circular hole 33c formed at a center portion of the elongate hole 33b.

The check ball 34 is movably accommodated in the second pin hole 32d, and has an outer diameter greater than the inner diameter of the first pin hole 32c and the inner diameter of the circular hole 33c of the check plate 33. Therefore, the check ball 34 closes the first hole 32c or seats against the circular hole 33c while moving in the pin hole 32d.

The O-ring 35 is coupled to the annular groove 31d of the damper body 31 to closely contact the inner circumferential surface of the third space 10c of the housing 10 inside, and prevents the oil from flowing between the outer circumferential surface of the oil damper 30 and the inner circumferential surface of the housing 10.

According to the above-described configuration, the assembly of the oil damper 30 is completed by inserting and coupling the first hanging end 32b to the first elongate hanging groove 31b after inserting the pin body 32a into the coupling hole 31a, inserting and coupling the second hanging end 33a of the check plate 33 to the second elongate hanging groove 31c after putting the check ball 34 in the second pin hole 32d, and coupling the O-ring 35 to the annular groove 31d. In the oil damper 30 assembled in this way, there are formed a first flow path constituted by the first and second pin holes 32c and 32d, and a second flow path constituted by the coupling hole 31a and the groove line 32e.

In this case, as the first flow path is constituted by the first and second pin holes 32c and 32d passing though the pin body 32a, the first flow path can allow more amount of oil to flow than the second flow path constituted by the coupling hole 31a and the groove line 32e.

Further, a damping force of the oil flowing via the second flow path can be varied by varying a width or the number of zigzags of the groove line 32e.

In the above-mentioned oil damper 30, as shown in FIG. 10, the first flow path is closed when the check ball 34 is moved to close the first pin hole 32c, and thereby the oil can flow only through the second flow path. Further, as shown in FIG. 11, when the check ball 34 is moved to be inserted in the circular hole 33c of the check plate, the second path is opened through the elongate hole 33b, and thereby the oil can flow fast through both the first flow path and the second flow path.

Next, operation of the aforementioned hinge device of the washing machine door will be described.

Figure 12:
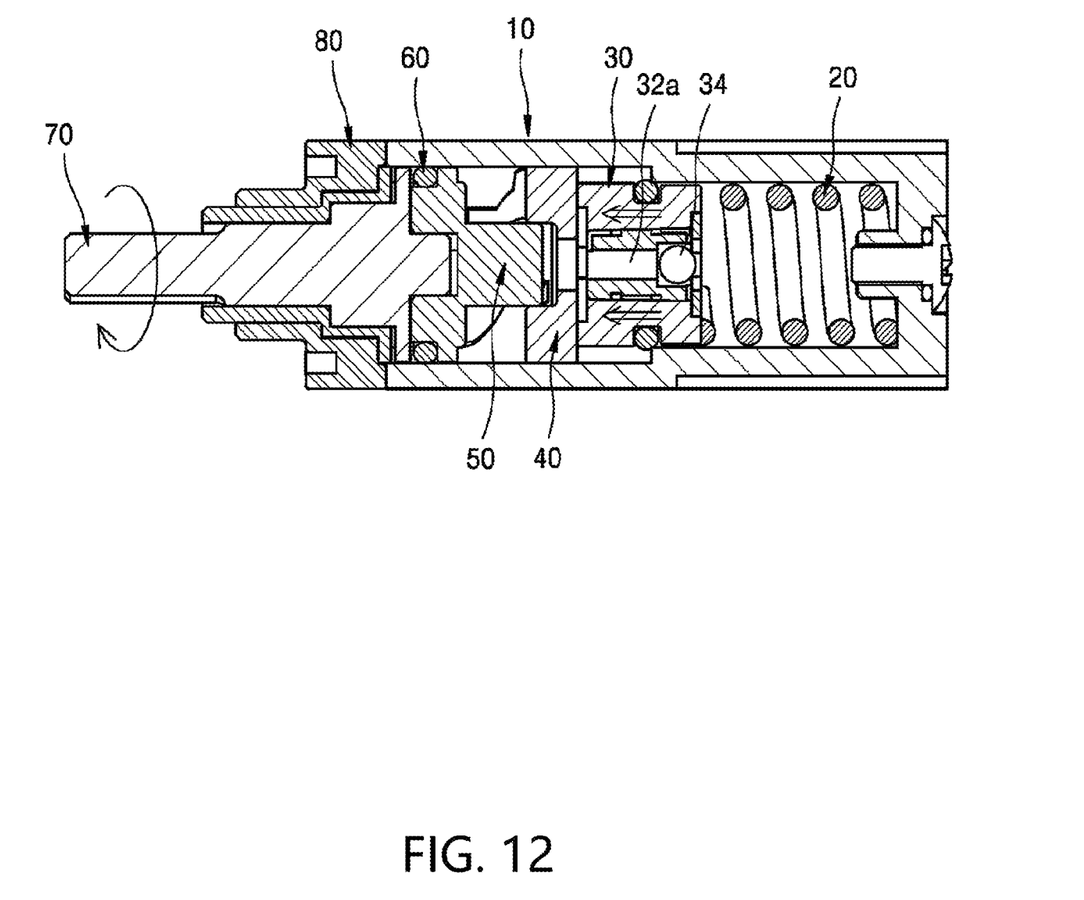
FIG. 12 is a cross-sectional view for explaining the operation in the hinge device of FIG. 4 when the door is closed to the washing machine main body.

FIG. 12 is a cross-sectional view for explaining the operation in the hinge device of FIG. 4 when the door is closed to the washing machine main body.

When the washing machine door is closed to the washing machine main body from its opened state, the hinge shaft 70 coupled to the door is rotated and thus the upper cam 50 is rotated so that the second cam 55 slantingly presses the first cam 45 of the lower cam 40 cam-coupled thereto. Then, the lower cam 40 is pressed toward the spring 20, and at this time, the check ball 34 closes the first pin hole 32c as shown in FIG. 11 due to pressure of the oil accommodated in the housing 10 of the spring 20 side to close the first flow path, which is constituted by the first pin hole 32c and the second pin hole 32d, and as a result of this, the oil can flow only through the second flow path, which constituted by the inner circumferential surface of the coupling hole 31a and the groove line 32e formed in a zigzag pattern, so that the oil slowly escapes through the oil damper 30. According to this, the damping force is applied by the oil damper 30 due to the oil slowly escaping, so that the lower cam 40 moves slowly, and consequently the hinge shaft 70 coupled to the upper cam 50 cam-coupled to the lower cam 40 is slowly rotated, and as a result, the door is closed smoothly and slowly.

Figure 13:
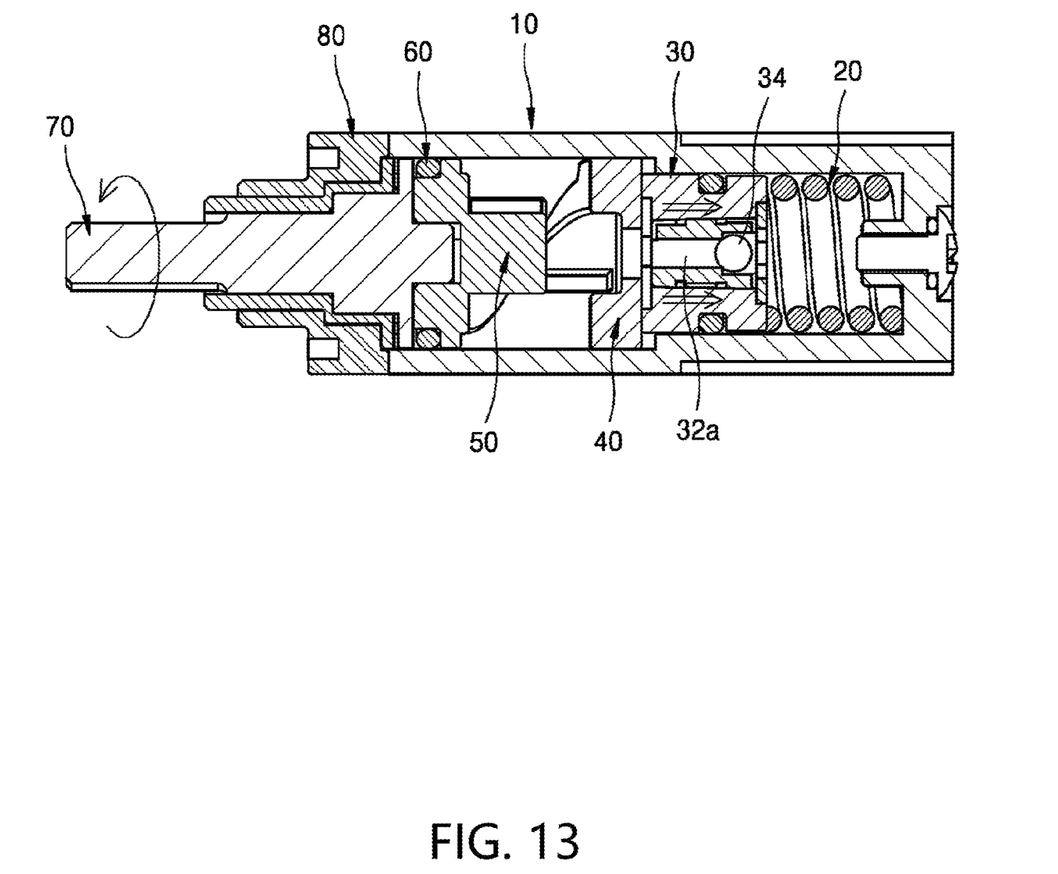
FIG. 13 is a cross-sectional view for explaining the operation in the hinge device of FIG. 12 when the door is opened from the washing machine main body.

FIG. 13 is a cross-sectional view for explaining the operation in the hinge device of FIG. 12 when the door is opened from the washing machine main body.

When the washing machine door is opened to the washing machine main body from its closed state, the upper cam 50 is rotated in an opposite direction by the hinge shaft 70 coupled to the door, so that the first cam 45 is instantaneously separated from the second cam 55 cam-coupled thereto, and the lower cam 40 is moved toward the upper cam 50 due to the resilient force of the spring 20. Then, the check ball 34 is moved toward the check plate 33 due to the oil pressure of the oil accommodated in the housing 10 of the upper cam 50 side as shown in FIG. 12 to be inserted into the circular hole 33c, and as a result, the first flow path is opened though the elongate hole 33b. Then, the oil can flow fast through both the first flow path and the second flow path, and according to this the oil damper 30 does not apply damping force, so that the door can be opened fast.

Here, as the check ball 34 can open or close the first flow path, which is constituted by the first pin hole 32c and the second pin hole 32d, by its small movement within the second pin hole 32d, the first flow path can be opened or closed immediately when the door is opened or closed slightly, thus instantaneously generating or removing the damping force. According to this, if the hinge device of the application is applied to a large washing machine door, the washing machine door is closed slowly even when the washing machine door is opened slightly and then closed, so the heavy washing machine door is prevented from being damaged by impact generated due to the relatively heavy washing machine door being closed hastily.

While the invention is described with reference to an embodiment shown in the drawings, the embodiment is just exemplary one, and those skilled in the art will understand that various modifications or equivalent other embodiments are possible.

INDUSTRIAL APPLICABILITY

Like this, according to the hinge device of the washing machine door of the application invention, by employing the oil damper 30 in which the first and second flow paths are formed, an uniform damping force can be applied between the lower cam 40 and the upper cam 50, thus enabling not only an opening and closing operation but also an opening and closing speed to be uniform even though time has elapsed.

Further, the first flow path is constituted by the first pin hole 32c and the second pin hole 32d, the second flow path is constituted by the inner circumferential surface of the coupling hole 31a and the groove line 32e formed in a zigzag pattern, and such a way as the check ball 34 opens or closes the first flow path inside the second pin hole 32d is employed, whereby, even when the washing machine door is opened slightly and closed, it is possible to generate a damping force which prevents the washing machine door from being closed hastily. According to this, if it is employed to a large washing machine, the damping force can be applied even when the door is slightly opened and closed, so that the relatively heavy washing machine door is prevented from being damaged due to the impact.

Additionally, as the oil is injected to the housing 10 through the injection hole 12, the damping force applied when the hinge shaft 70 is rotated can be varied by varying viscosity of the oil filled after assembly of the hinge device of the invention has been completed, so that it is possible to be applied universally to a relatively heavy or light door.

The invention claimed is:

1. A hinge device for a washing machine door comprising:
a housing that is fixed to one among a washing machine main body and a washing machine door, and in which a plurality of guide projections are provided at an inlet side and an injection hole, through which oil is injected, is formed at a rear side;
a spring inserted into the housing;
an oil damper that is elastically supported by the spring, and in which first and second flow paths passing therethrough are formed;
a lower cam that closely contacts a front end of the oil damper, and in which a guide groove guided along the guide projection is formed in a side surface and a first cam having an inclined surface is provided at an upper side;
an upper cam in which a second cam cam-coupled to the first cam is provided at a lower side, and a fitting protrusion is provided at an upper side;
a main O-ring that closely contacts an inner circumferential surface of the housing while coupled to the fitting protrusion, and is for preventing the oil filling the housing from leaking to the outside;
a hinge shaft non-rotatably coupled to the upper cam and fixed to another among the washing machine main body and the washing machine door; and
a bush cover supporting the hinge shaft so that the hinge shaft passes therethrough, and allowing the hinge shaft to smoothly rotate while coupled to the inlet of the housing,
wherein the oil damper includes a damper body elastically supported by the spring; a damper pin coupled with the damper body; a check plate coupled to the damper body such that the damper pin is accommodated; a check ball accommodated in the damper pin and constrained from leaving the damper pin by the check plate; and an O-ring coupled to an outer circumferential surface of the damper body, and
wherein the damper body includes a coupling hole passing therethrough, a first elongate hanging groove with an inner diameter greater than that of the coupling hole, a second elongate hanging groove with an inner diameter greater than that of the first elongate hanging groove, and an annular groove which is formed on the outer circumferential surface, and into which the O-ring is coupled.

2. The hinge device for a washing machine door of claim 1, wherein the damper pin includes a pin body inserted into and coupled to the coupling hole, a first hanging end which is formed at one side of the pin body, and inserted into and coupled to the first elongate hanging groove, a first pin hole passing through the pin body, a second pin hole which is formed in the pin body of the first hanging end side and has an inner diameter greater than that of the first pin hole, and a groove line formed in a zigzag pattern along an outer circumferential surface of the pin body and an outer circumferential surface of the first hanging end.

3. The hinge device for a washing machine door of claim 2, wherein the check plate includes a second hanging end inserted into and coupled to the second elongate hanging groove of the damper body, an elongate hole formed at a center portion, and a circular hole formed at a center portion of the elongate hole, and
wherein the check ball is movably accommodated in the second pin hole, and has an outer diameter greater than the inner diameter of the first pin hole and the inner diameter of the circular hole.

* * * * *